(12) United States Patent
Møller et al.

(10) Patent No.: US 10,679,673 B2
(45) Date of Patent: Jun. 9, 2020

(54) SYNCHRONIZATION IN AUDIO PLAYBACK NETWORK INDEPENDENT OF SYSTEM CLOCK

(71) Applicant: Roku, Inc., Los Gatos, CA (US)

(72) Inventors: Brian Thoft Moth Møller, Aalborg SV (DK); Paul Fleischer, Aarhus V (DK); Bjørn Reese, Aarhus V (DK)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/547,106

(22) PCT Filed: Jan. 27, 2016

(86) PCT No.: PCT/DK2016/050022
§ 371 (c)(1),
(2) Date: Jul. 28, 2017

(87) PCT Pub. No.: WO2016/119793
PCT Pub. Date: Aug. 4, 2016

(65) Prior Publication Data
US 2018/0012631 A1 Jan. 11, 2018

(30) Foreign Application Priority Data
Jan. 28, 2015 (DK) .................... 2015 70047

(51) Int. Cl.
*G11B 27/10* (2006.01)
*H04N 21/414* (2011.01)
(Continued)

(52) U.S. Cl.
CPC ....... *G11B 27/10* (2013.01); *H04N 21/41407* (2013.01); *H04N 21/4302* (2013.01);
(Continued)

(58) Field of Classification Search
CPC .............. G11B 27/10; H04N 21/8547; H04N 21/43637
See application file for complete search history.

(56) References Cited

U.S. PATENT DOCUMENTS 6,192,397 B1  2/2001  Thompson
6,598,172 B1 * 7/2003  VanDeusen ........... H04J 3/0632
                                                            370/389
(Continued)

FOREIGN PATENT DOCUMENTS

WO   WO 2006/053704 A1   5/2003
WO   WO 2012/018300 A2   2/2012
WO   WO 2013/184792 A1   12/2013

OTHER PUBLICATIONS

International Search Report issued in related application dated Jun. 2, 2016.
(Continued)

*Primary Examiner* — Nicholas R Taylor
*Assistant Examiner* — Sanjoy Roy
(74) *Attorney, Agent, or Firm* — Sterne, Kessler, Goldstein & Fox P.L.L.C.

(57) ABSTRACT

A method is provided for synchronizing playback of audio an/or video by a plurality of separate devices in a computer network. Each separate device generates a virtual clock in response to a timing of the audio codec of a received audio stream. Either the virtual clock is generated directly in response to the tick counter of the audio codec, or by a periodic measurement of the timing of the audio codec interpolated by a monotonic clock. A sample rate converter may be used to slightly adjust the frequency of the virtual clock.

20 Claims, 2 Drawing Sheets

(51) Int. Cl.
    *H04N 21/436*     (2011.01)
    *H04N 21/43*      (2011.01)
    *H04N 21/8547*    (2011.01)
    *H04N 21/4363*    (2011.01)

(52) U.S. Cl.
    CPC . *H04N 21/43615* (2013.01); *H04N 21/43637* (2013.01); *H04N 21/8547* (2013.01)

(56) References Cited

U.S. PATENT DOCUMENTS

| | | | |
|---|---|---|---|
| 2004/0086000 A1* | 5/2004 | Wallace | H04L 12/40019 370/503 |
| 2004/0187043 A1* | 9/2004 | Swenson | G06F 1/12 713/400 |
| 2006/0156375 A1 | 7/2006 | Konetski | |
| 2006/0161835 A1 | 7/2006 | Panabaker et al. | |
| 2006/0270395 A1 | 11/2006 | Dhawan et al. | |
| 2011/0019699 A1* | 1/2011 | Sun | H03L 7/0807 370/509 |
| 2012/0265522 A1* | 10/2012 | Fex | G10L 19/167 704/201 |
| 2014/0181270 A1* | 6/2014 | Millington | G06F 3/167 709/219 |
| 2014/0269776 A1 | 9/2014 | Bomfim et al. | |
| 2016/0180857 A1* | 6/2016 | Reuschl | G10L 19/012 704/503 |

OTHER PUBLICATIONS

Written Opinion issued in related application dated Jun. 2, 2016.
Yen et al.; On the Synchronization Mechanisms for Multimedia Integrated Services Networks; School of Electrical and Computer Engineering; Georgia Institute of Technology, Atlanta, GA; Nov. 13, 1994, pp. 168-184.

* cited by examiner

SYNCHRONIZATION IN AUDIO PLAYBACK NETWORK INDEPENDENT OF SYSTEM CLOCK

FIELD OF THE INVENTION

The present invention relates to the field of synchronized playback of audio or video between devices in a peer-to-peer computer network system, e.g. in a wi-fi network.

BACKGROUND OF THE INVENTION

In synchronized playback of audio or video between a plurality of devices in a peer-to-peer computer network system, the devices can participate in coordinated sessions, where the participating devices can play synchronously. The participating devices can be located within or across several rooms.

In order to play synchronously, the participating devices need to agree on the playback time and pace. One of the key parameters of providing precise audio playback synchronization is the ability to share the same time between multiple devices in a network.

Solutions exist that have various means to achieve synchronized audio playback. Some of these system use the system clock, others provide a hardware solution requiring each of the nodes in the network to run with dedicated hardware. Even when working without adjusting the system clocks as provided by the operating system, these solutions often construct clocks that are derived from the system clock, adjusted with a frequency and offset component to match some remote system. However, such synchronization is in general not accurate.

SUMMARY OF THE INVENTION

Thus, according to the above description, it is an object of the present invention to provide an accurate way of providing synchronized playback of audio and/or video in a computer network of a plurality of devices.

In a first aspect, the invention provides a method for synchronizing playback of audio and/or video from a source in computer network of a plurality of separate devices in a computer network session, see appended claim 1.

This invention describes a virtual clock, which allows time synchronization between audio/video devices in a peer-to-peer network audio playback system without requiring the primary system clocks being synchronized, while also avoiding long-term dependency on accuracy of such clocks.

Besides easing the integration of audio synchronization systems, this allows for a more direct synchronization between the audio clocks, ultimately resulting in a better synchronization.

According to this invention, multiple devices can play the same audio or video experience in a synchronized manner across a computer network, without requiring specialized hardware or system clock adjustments.

By working closely with the clocking system that controls the audio playback, a more accurate synchronization can be made than when synchronizing system clocks and adjusting playback according to the system clocks.

In the dependent claims 2-11, a number of embodiments and/or preferred features will be defined.

In a second aspect, the invention provides a protocol for controlling a plurality of separate devices in a computer network, see appended claim 12.

In a third aspect, the invention provides a computer executable program code, or a programmable- or fixed hardware, and/or combination hereof, arranged to perform the method according to the first aspect, or causes a device with a processor to function according to the protocol of the second aspect. The computer executable program code may be stored on a data carrier. The program code may be implemented to function on any type of processor platform.

In a fourth aspect, the invention provides a device that operates according to the method or protocol of the first or second aspect. Especially, the device may be an audio device, such as a stand alone active loudspeaker. The device may also be any other type of device with audio and/or video capabilities, e.g. a TV set.

In a fifth aspect, the invention provides a system of a plurality of devices according to the fourth aspect, e.g. mixed types of devices arranged to take part in a computer network session, e.g. a wi-fi network session, of synchronized playback of audio and/or video content.

In a sixth aspect, the invention provides an electronic chip programmed to allow a device to operate according to protocol according to the third aspect, if provided with access to the electronic chip, e.g. if the device has the chip installed therein.

It is appreciated that the same advantages and embodiments described for the first aspect apply as well for the second, third, fourth, fifth, and sixth aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
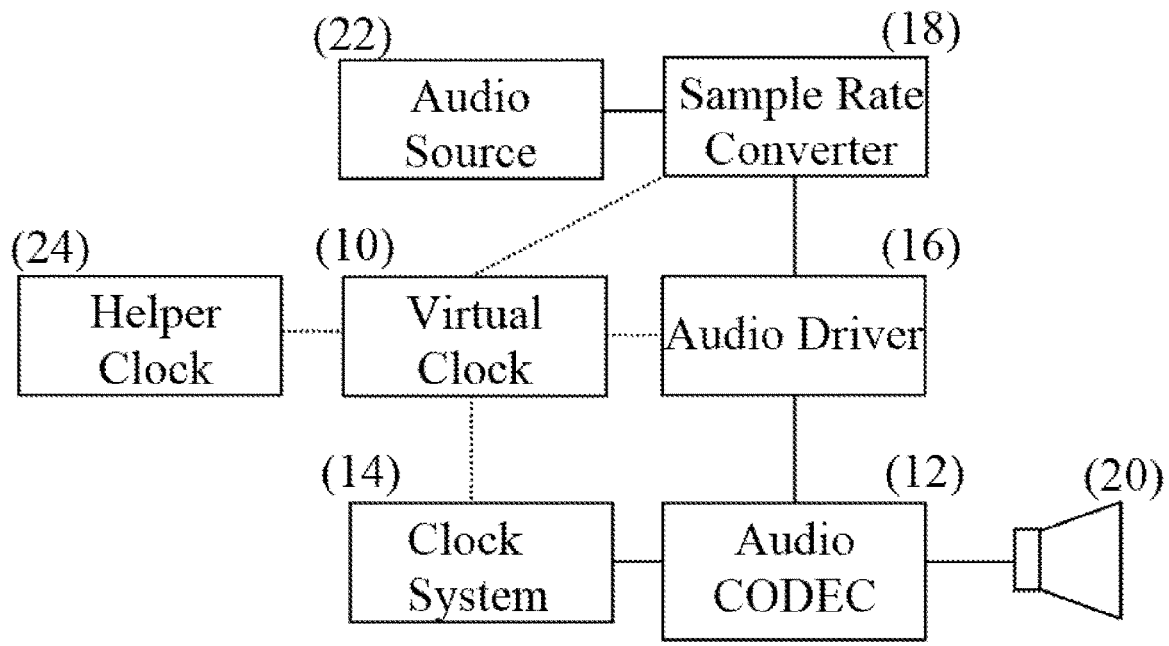
FIG. 1 illustrates one embodiment of a virtual clock (10) based on an Audio CODEC (12), with the possibility of fine tuning.

FIG. 1 illustrates an audio pipeline, where an audio source (22) delivers its audio data to the audio driver (16) with an intermediate sample rate converter (18).

The Audio CODEC (12) is driven by a clock system (14), and produces an audio signal (digital or analog) which is passed on to downstream elements (20), such as a loudspeaker or an amplifier.

The virtual clock (10) can be driven by the clock system (14) or the audio driver (16), depending on the hardware and operating system configuration. The helper clock (24) may be needed, if the clock system (14) does not provide a tick counter. The Sample rate converter (18) is used to adjust the playback rate, in case the clock system (14) frequency cannot be fine-tuned.

Defining a virtual clock (10), which is driven by the audio codec (12) of an audio device, allows reasoning about time in the domain of the audio device. By allowing the current time to be read and adjusted with minimal involvement of other clocks or timing sources, the virtual clock maintains a close relationship with the audio codec timing of a single sample. This is preferred to allow high quality synchronization between multiple devices across a computer network.

In order to be independent of the audio driver architecture, the virtual clock can be implemented in at least the two preferred ways: One utilizing direct access to the tick counter of clock system of the audio codec, and one making periodic measurements and interpolating between these measurements.

For systems that allow access to the tick counter of the clock system (14), which drives the audio codec (12), the tick counter will be used as the primary timing information. Reading the value of the virtual clock will therefore return the tick counter value. However, in order to deal with overflows of the tick counter, a value internal to the virtual clock is added, as will be described shortly.

In systems, where the tick counter of the clock system driving the audio codec cannot be accessed, the virtual clock is controlled by either a) keeping track of the pace at which samples are consumed by the audio driver (16), or, b) interrupts at regular intervals generated by the clock system (14).

Figure 2:
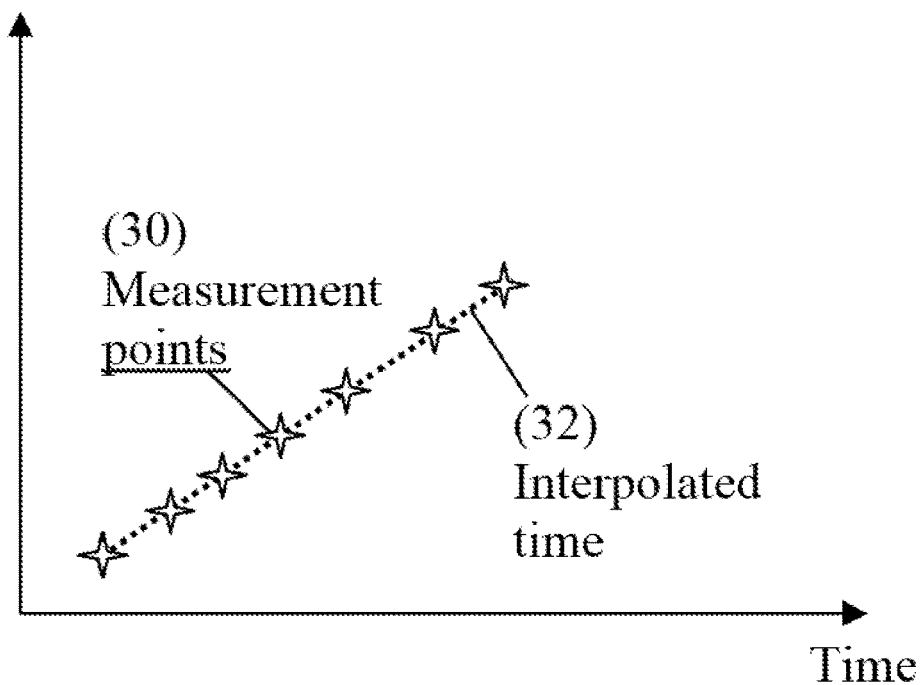
FIG. 2 shows discrete updates of the virtual clock in terms of measurement points (30), and how time is interpolated between them (32)

FIG. 2 shows discrete updates of the virtual clock in terms of measurement points (30), and how time is interpolated between them (32). In general, this yields regular measurement points (30). The rate of these are either equal to the number of write interactions with the audio driver, or with the rate of interrupts generated by the clock system (14). In order to allow the virtual clock to have a resolution higher than this rate, a monotonic helper clock (24) is used to interpolate time (32) between the measurement points (30) that these updates constitute. An example of such a monotonic clock is the monotonic system clock. In order to ensure that the frequency of the virtual clock follows that of the audio codec, a frequency adjustment is made when interpolating as to match the audio codec's frequency, as measured between the updates. The frequency of audio driver interaction or the frequency of the interrupt is kept high enough such that the period where interpolation occurs is short. Each update (interrupt or driver interaction) will correct any drift introduced by the monotonic helper clock.

In order to allow a virtual clock to be synchronized with one or more other clocks, it must be possible to adjust the frequency of the virtual clock (and thus the audio codec's playback rate) ever so slightly, as large or abrupt adjustments are perceptible to the human ear. For systems that allow direct control with the clock system (14) of the audio codec (12), this adjustment can be made directly. For systems where this is not possible, a sample rate converter (18) may be used to slightly lengthen or shorten playback time of individual buffers.

In order to allow the virtual clock to be used to synchronize playback within the audio network, it is preferably be monotonic. When a tick counter is provided by the clock system (14), the absolute value of the virtual clock is a sum of the tick counter and an offset internal to the virtual clock. When the tick counter of the underlying clock shows non-monotonic behavior, the virtual clock compensates for this by increasing its internal offset. If no tick counter is provided, the virtual clock's internal offset is increased on each timer update, be it driven by an interrupt or an audio driver interaction. If the interpolation between two updates results in non-monotonic behavior, the virtual clock compensates by temporarily increasing the internal offset, and adjusting the frequency used for interpolations until next update. This ensures monotonicity of the virtual clock, regardless of the physical clock or audio driver behavior.

Using the virtual clock to synchronize events requires the virtual clock to be running at all times. However, being dependent on the audio codec's clocking, audio needs to pass through the audio pipeline in order for the virtual clock to be running. This can be achieved by playing zeros: There is no audio, but the entire audio pipeline is kept running, and timing is maintained.

Figure 3:
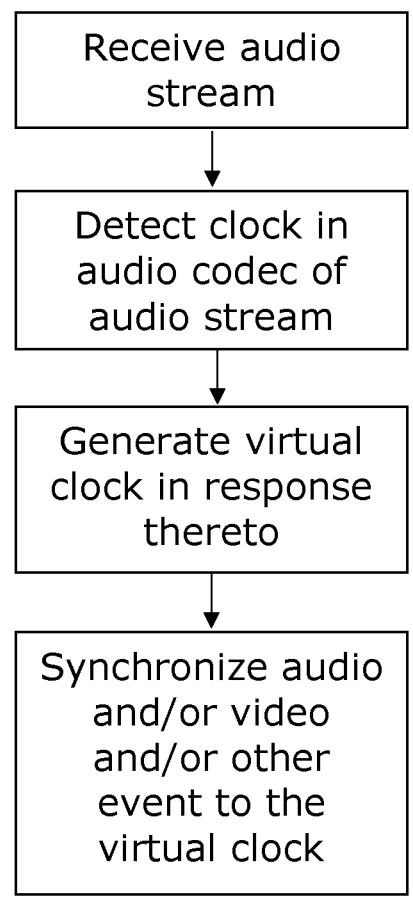
FIG. 3 illustrates steps of a virtual clock synchronization scheme embodiment.

FIG. 3 shows an example of steps of a synchronization scheme embodiment, where a virtual clock is generated in response to the incoming audio stream, and wherein the virtual clock is used to synchronize playback of audio and/or video, and/or an other event.

To sum up: the invention provides a method for providing a synchronization in a computer network for synchronized playback of audio an/or video by a plurality of separate devices. Each separate device generates a virtual clock in response to a timing of the audio codec of a received audio stream. Either the virtual clock is generated directly in response to the tick counter of the audio codec, or by a periodic measurement of the timing of the audio codec interpolated by a monotonic clock. A sample rate converter may be used to slightly adjust the frequency of the virtual clock.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for synchronizing playback from a source in a plurality of separate devices in a peer-to-peer computer network, the method comprising:
   receiving, by a device of the plurality of separate devices via the peer-to-peer computer network, an audio stream encoded by an audio codec of the source;
   retrieving clock information based on a tick counter of a clock system of an audio codec of the device;
   generating a virtual clock based on the clock information and an internal offset of the virtual clock;
   based on non-monotonic behavior of the tick counter, increasing the internal offset of the virtual clock; and
   synchronizing the playback of the audio stream based on the virtual clock, wherein the playback at the device is synchronized with each of the plurality of separate devices in the peer-to-peer computer network.

2. The method according to claim 1, further comprising, generating the virtual clock based on periodic measurements of the clock system of the audio codec of the device responsive to determining that the tick counter of the clock system is not accessible.

3. The method according to claim 2, further comprising generating the virtual clock in response to an interpolation between the periodic measurements of the clock system of the audio codec of the device.

4. The method according to claim 3, further comprising utilizing a monotonic helper clock to interpolate time between the periodic measurements of the clock system of the audio codec of the device.

5. The method according to claim 1, further comprising adjusting a clock frequency of the virtual clock to match a frequency of the audio codec of the device.

6. The method according to claim 1, wherein at least one of the plurality of separate devices comprises a loudspeaker configured for the playback of the audio stream.

7. The method according to claim 1, wherein at least one of the plurality of separate devices comprises a display configured to synchronize the playback of video streamed to the at least one of the plurality of separate devices based on the virtual clock.

8. The method according to claim 1, wherein the peer-to-peer computer network is a wireless computer network.

9. The method according to claim 1, further comprising continuously running the virtual clock.

10. The method according to claim 9, further comprising receiving an audio stream of zeros in order to provide a reference of timing to generate the virtual clock.

11. A non-transitory, tangible computer readable medium having instructions stored thereon that, when executed by a device of a plurality of separate devices in a peer-to-peer computer network, cause the device to perform operations comprising:
receiving, via the peer-to-peer computer network, an audio stream encoded by an audio codec;
retrieving clock information based on a tick counter of a clock system of an audio codec of the device;
generating a virtual clock based on a sum of the clock information and an internal offset of the virtual clock;
based on non-monotonic behavior of the tick counter, increasing the internal offset of the virtual clock; and
synchronizing the playback of the audio stream based on the virtual clock, wherein the playback at the device is synchronized with each of the plurality of separate devices in the peer-to-peer computer network.

12. A device comprising:
a network interface configured to receive, from a source in a peer-to-peer computer network, an audio stream; and
a processor configured to:
receive, via the peer-to-peer computer network, an audio stream encoded by an audio codec of the source;
retrieve clock information based on a tick counter of a clock system of an audio codec of the device;
generate a virtual clock based on a sum of the clock information and an internal offset of the virtual clock;
based on a behavior of the tick counter, increase the internal offset of the virtual clock; and
synchronize playback of the audio stream based on the virtual clock, wherein the playback at the device is synchronized with each of the plurality of separate devices in the peer-to-peer computer network.

13. The device according to claim 12, further comprising an audio device arranged to receive audio data via the network interface and playback an acoustic signal.

14. The non-transitory, tangible computer-readable device according to claim 11, the operations further comprising generating the virtual clock based on periodic measurements of the clock system of the audio codec of the device, responsive to determining that the tick counter of the clock system is not accessible.

15. The non-transitory, tangible computer-readable device according to claim 14, the operations further comprising generating the virtual clock in response to an interpolation between the periodic measurements of the clock system of the audio codec of the device.

16. The non-transitory, tangible computer-readable device according to claim 15, the operations further comprising utilizing a monotonic helper clock to interpolate time between the periodic measurements of the clock system of the audio codec of the device.

17. The non-transitory, tangible computer-readable device according to claim 11, the operations further comprising adjusting a clock frequency of the virtual clock to match a frequency of the audio codec of the device.

18. The device according to claim 12, the processor further configured to generate the virtual clock based on periodic measurements of the clock system of the audio codec of the device responsive to determining that the tick counter of the clock system is not accessible.

19. The device according to claim 18, the processor further configured to generate the virtual clock in response to an interpolation between the periodic measurements of the clock system of the audio codec of the device.

20. The device according to claim 19, the processor further configured to utilize a monotonic helper clock to interpolate time between the periodic measurements of the clock system of the audio codec of the device.

* * * * *